United States Patent
Lee et al.

[11] Patent Number: 5,905,701
[45] Date of Patent: *May 18, 1999

[54] TRACK JUMP STABILIZING METHOD OF DISK DRIVE

[75] Inventors: Do-Soo Lee; Young-Ok Goh, both of Suwon, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,150

[22] Filed: Oct. 31, 1996

[30] Foreign Application Priority Data

Dec. 27, 1995 [KR] Rep. of Korea ................ 59420/1995

[51] Int. Cl.$^6$ ....................................................... G11B 7/00
[52] U.S. Cl. .................................. 369/44.28; 369/44.29
[58] Field of Search ......................... 369/44.28, 44.27, 369/44.25, 32, 44.26, 44.29, 44.32, 44.35, 54, 58; 360/78.04, 78.14

[56] References Cited

U.S. PATENT DOCUMENTS 5,477,513 12/1995 Onodera et al. ..................... 369/44.28
5,532,988 7/1996 Yokogama ............................ 369/44.28

*Primary Examiner*—Paul W. Huber
*Attorney, Agent, or Firm*—Sughrue, Mion, Zinn, Macpeak & Seas, PLLC

[57] ABSTRACT

A method for stabilizing track jump of a recording medium by which bumping of an object lens disposed in a sled against the sled's wall can be prevented during a track jump for accessing a desired track on a recording medium, in which tracking is turned off whenever the sled is kicked and the numbers of zero crossing of the track are counted by first turning off the sled, and alternately kicking the tracking and checking the zero crossing, until the zero crossing reaches a predetermined number.

10 Claims, 6 Drawing Sheets

(PRIOR ART)
Fig. 5A
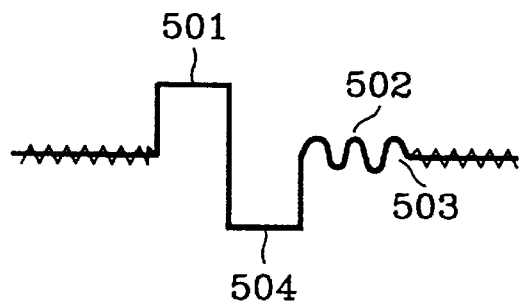
(PRIOR ART)
Fig. 5B
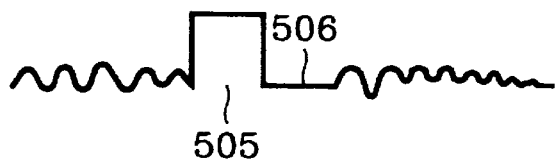
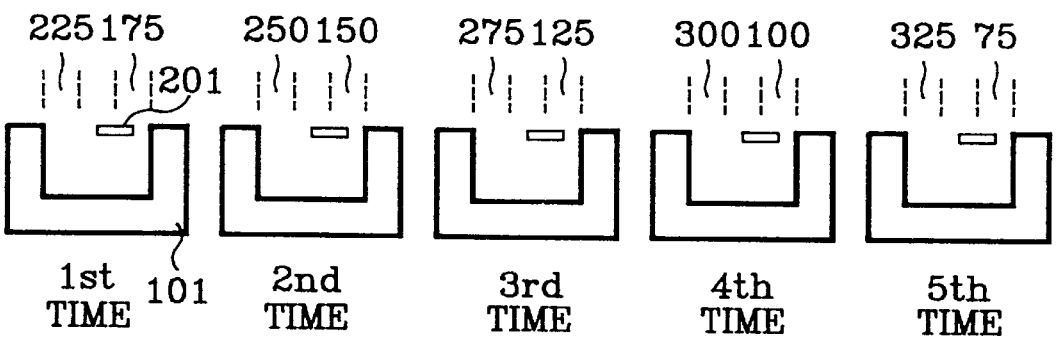
(PRIOR ART)
Fig. 6

TRACK JUMP STABILIZING METHOD OF DISK DRIVE

BACKGROUND OF THE INVENTION

1. Field of the Invention

The present invention relates to a method for stabilizing track jump in a disk drive, and more particularly, to a track jump stabilizing method of a disk drive wherein jump margin is stabilized by controlling the jump timing of the sled and the actuator.

The present application is based on Korean Application No. 59420/1995 which is incorporated herein by reference for all purposes.

2. Description of the Related Art

In general, referring to FIGS. 1 and 2, pickup 101 traces tracks of a disk by a tracking servo, and pickup body 117 jumps in accordance with the track playing since the tracking movement range of the object lens 201 driven by an actuator is limited. Also, in order to access a desired song, the pickup body 117 jumps to reach that song. At this time, the maximum jump range is conventionally set to within about ±200 tracks. When a targeted jump is beyond 200 tracks, access time is delayed due to focus drop or track oscillation. However, an excessive delay may cause degradation of the data. In a conventional manufacturing process, a jump algorithm has been adopted for mass tests of the deviation of the deck (change of a sign) or that of the drive circuit voltage.

In mass production of disk drives, the test algorithm of FIG. 4 is conventionally used. FIG. 3 is a control system diagram for explaining the conventional jumping algorithm. The control system is comprised of a command logic circuit 302, which receives from microcomputer 300 commands for controlling the tracking and the sled, and generating a sled driving control signal and a switching control signal. Pulse generator 303 is controlled by the output of the command logic circuit 302 to generate tracking kick/brake and sled driving control signals for pickup 306. Servo controller 304 controls the driving of the pickup and the sled. Switching unit 331 selects the tracking kick/brake and sled movement signals generated from the command logic circuit 302 or the sled and a pickup reproducing control signal of the servo controller to provide to the pickup 306.

Referring to FIG. 4, the microcomputer 300 generates a track jump command signal in step 4a. Then, the signal is analyzed at the command logic circuit 302 and applied to the pulse generator 303. The switching signal generated from the command logic circuit 302 and applied via switching control 313 turns on sled and tracking driving on/off switches 317 and 318 and makes switches 319 and 320 contact point 1. Thus, in step 4b, tracking is kicked as in FIG. 5A and the sled is kicked as in FIG. 5B, both being controlled to be concurrently driven (see 501 and 505 of FIGS. 5A and 5B). Correspondingly, the pickup 306 is driven and the control result of the pickup is applied to the servo controller 304. The servo controller 304 detects the zero crossing state (i.e., the state where a track is sensed) according to the driving state of the pickup 306 and informs the microcomputer 300. The microcomputer 300 counts the zero crossing states and checks whether the track zero crossing reaches 50 in step 4c. When the track zero crossing reaches 50, the microcomputer 300 brakes the tracking (see 504 of FIG. 5A) and applies a control signal for sled-off to the command logic circuit 302 (see 506 of FIG. 5B). The command logic circuit 302 outputs signals for tracking brake and sled-off to the pulse generator 303 and the pulse generator 303 generates corresponding signals to provide to the pickup 306 via the switches 317, 318, 319 and 320. At this time, the tracking assumes a braking state and the sled is turned off.

In step 4e, the microcomputer 300 checks whether the number of the zero crossing reaches 50 through the servo controller 304. When 50 is reached, in step 4f, tracking gain is turned on and the sled is turned on as in 502 of FIG. 5A. After time is delayed for 10 ms in step 4g, the switches 319 and 320 are positioned at a point 2 according to the signals of the command logic circuit 302 via switching control 313 so that the tracking is turned on in step 4h.

Considering the problem of jumping over 100 tracks, when continuous jumping over 100 tracks is made, tracking, i.e., actuator, reaches exactly 160 $\mu m \pm 10\%$ (1.6 $\mu m \times 100$ tracks) by checking the track zero crossing. However, the sled has an error of 25–30% (movement distance error of 160 $\mu m \pm 30\%$) due to the load deviation of the deck and that of sled voltage. The error becomes further considerable due to the deviation of the tracking and sled movement time as shown in FIG. 6.

FIG. 6 shows an example of when the actuator, the pickup 101 and the object lens 201, are concurrently moved 5 times at an error of 20%. When one jump covers 100 tracks, the margin becomes 75 tracks, assuming that the tracking of the object lens 201 and the sled driving of the pickup 101 occur concurrently as in the example of FIGS. 5A and 5B. Thus, the object lens 201 bumps the pickup 101 since 25 tracks are missed for every jump. Consequently, the focus drops and tracking oscillation occurs accordingly.

That is, since the pickup servo and the lens actuator have different operational characteristics (e.g., different response curve), if the track jump command is applied to both concurrently, the lens actuator may attempt to reach a track beyond the range allowed by the pickup servo. Specifically, if is the pickup servo is slow to respond to the jump command, it may take a short time before it can place the lens at a location where the target track is within the range of movement of the actuator. Therefore, if the actuator is attempting to reach that track prematurely, the lens will collide with the pickup wall.

SUMMARY OF THE INVENTION

To solve the above problems, it is an object of the present invention to provide a method of stabilizing the track jump of a disk drive.

Accordingly, to achieve the above object, a method is provided for stabilizing track jump by which bumping of the object lens against the sled wall can be prevented during a track jump for accessing a desired track on a recording medium. According to the inventive method, tracking is turned off whenever the sled is kicked for every track jump. After a time delay, tracking is turned back on, and zero crossings are counted.

BRIEF DESCRIPTION OF THE DRAWINGS

FIGS. 5A and 5B are timing diagrams both indicating the control of the conventional tracking and sled;

FIG. 6 shows the movement of a conventional pickup portion and an actuator;

DETAILED DESCRIPTION OF THE PREFERRED EMBODIMENT

Figure 1:
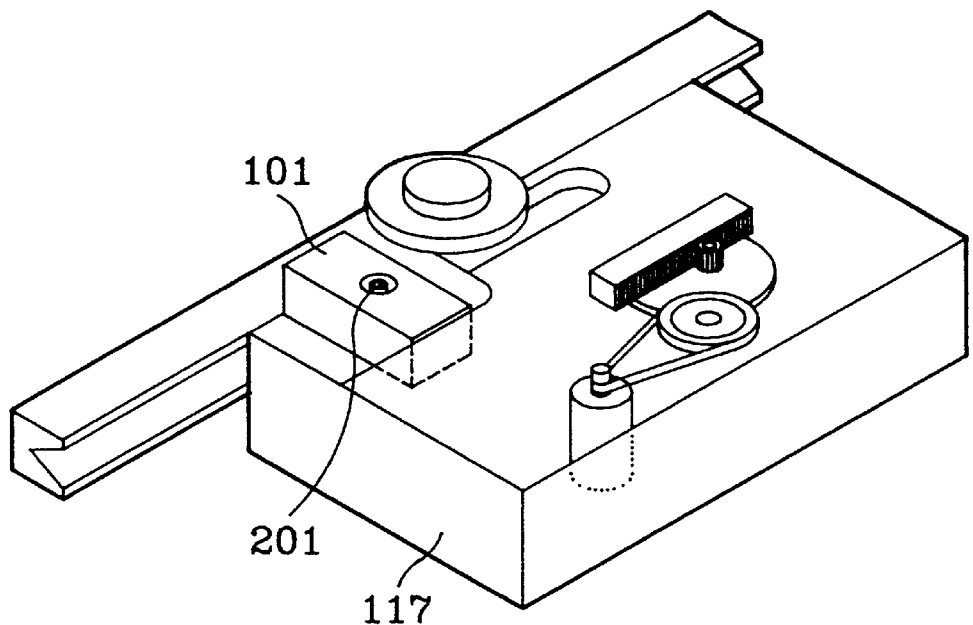
FIG. 1 is a perspective view illustrating a sled of an embodiment of the present invention.
Figure 2:
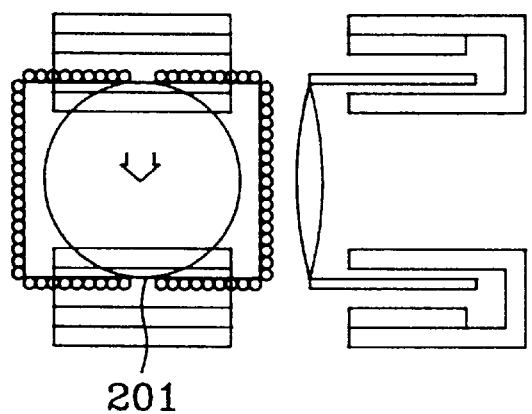
FIG. 2 is a schematic view illustrating the structure of a conventional tracking actuator.
Figure 3:
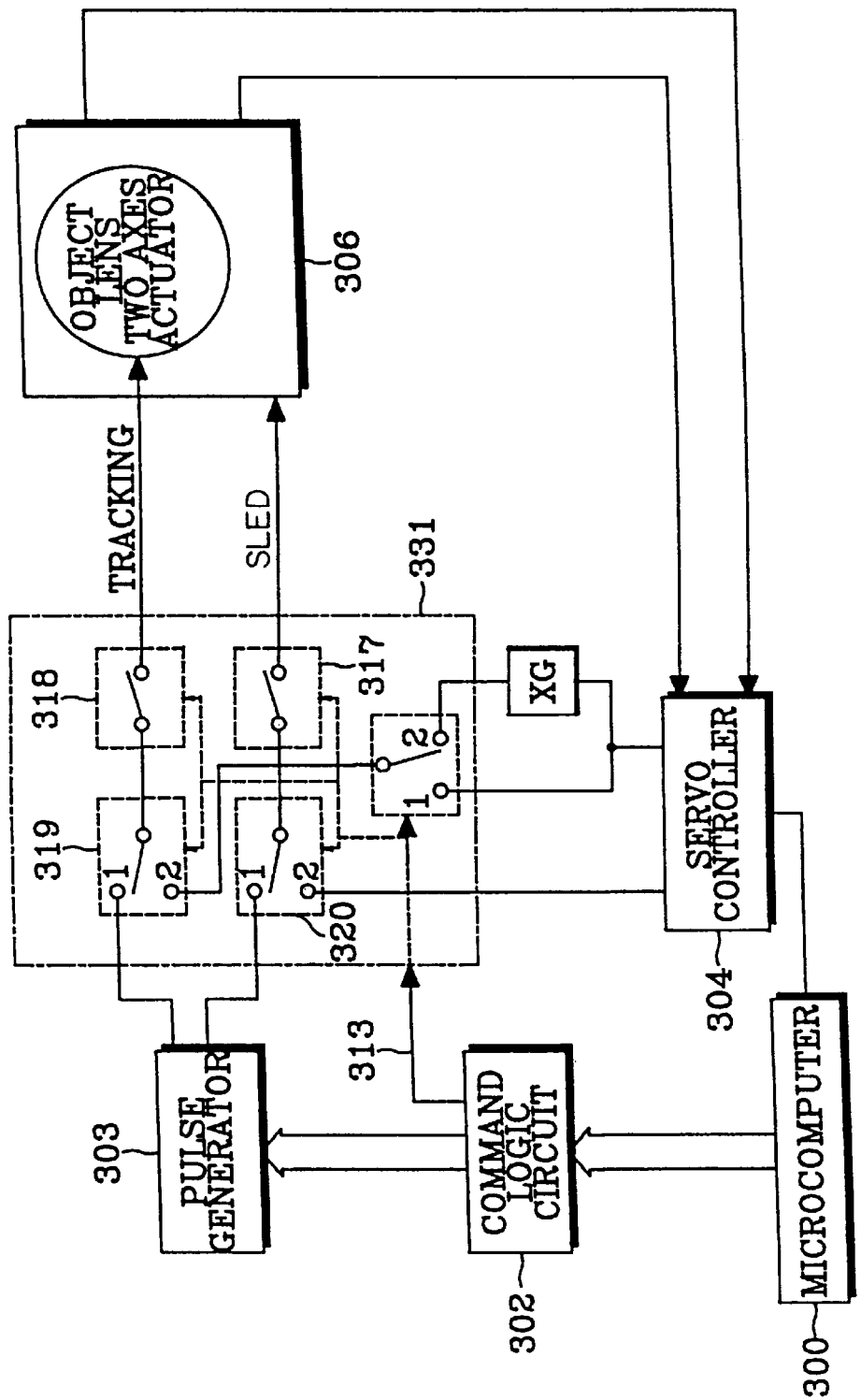
FIG. 3 is a control circuit diagram of a conventional tracking and sled.
Figure 4:
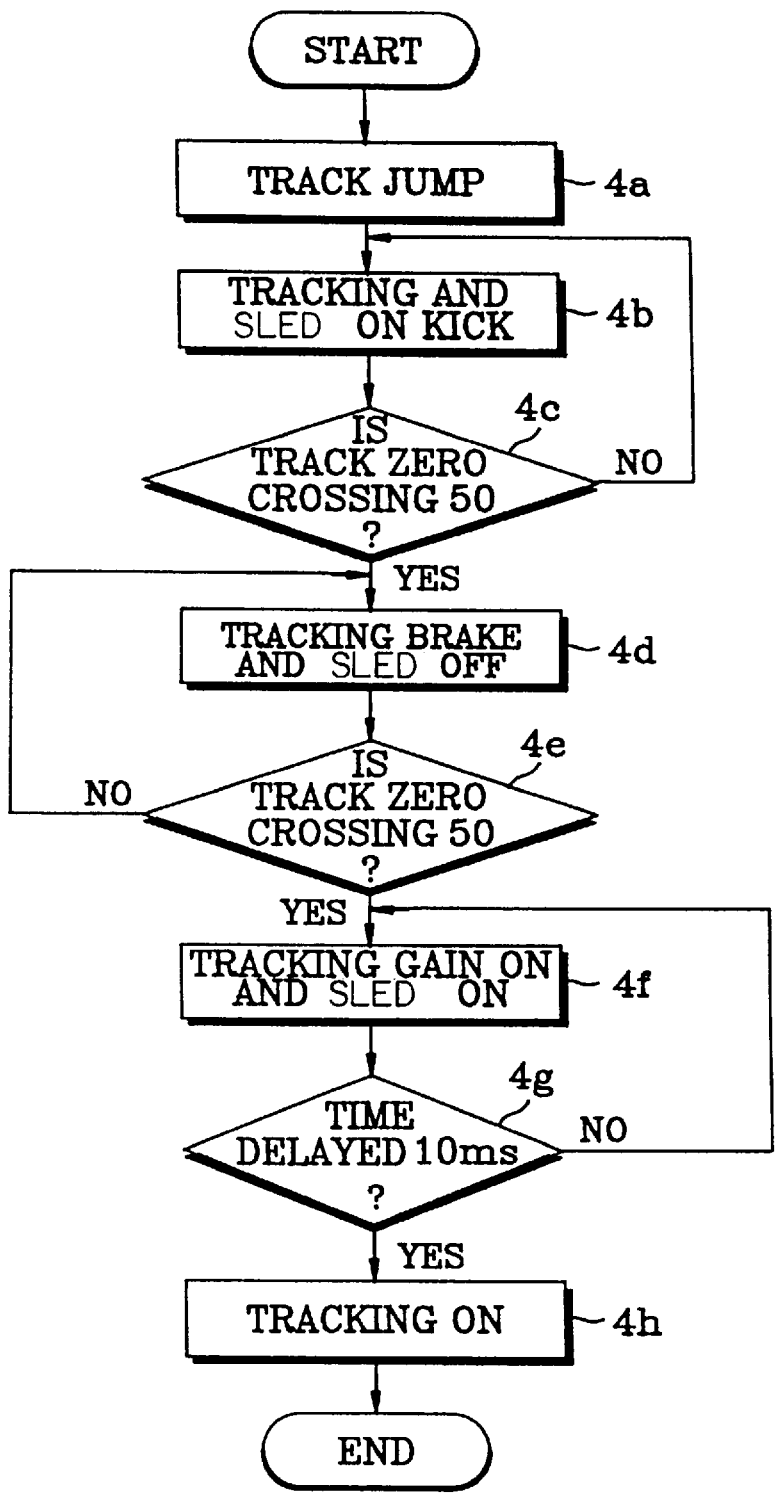
FIG. 4 is a flow chart for explaining the control of the conventional tracking and sled.
Figure 7:
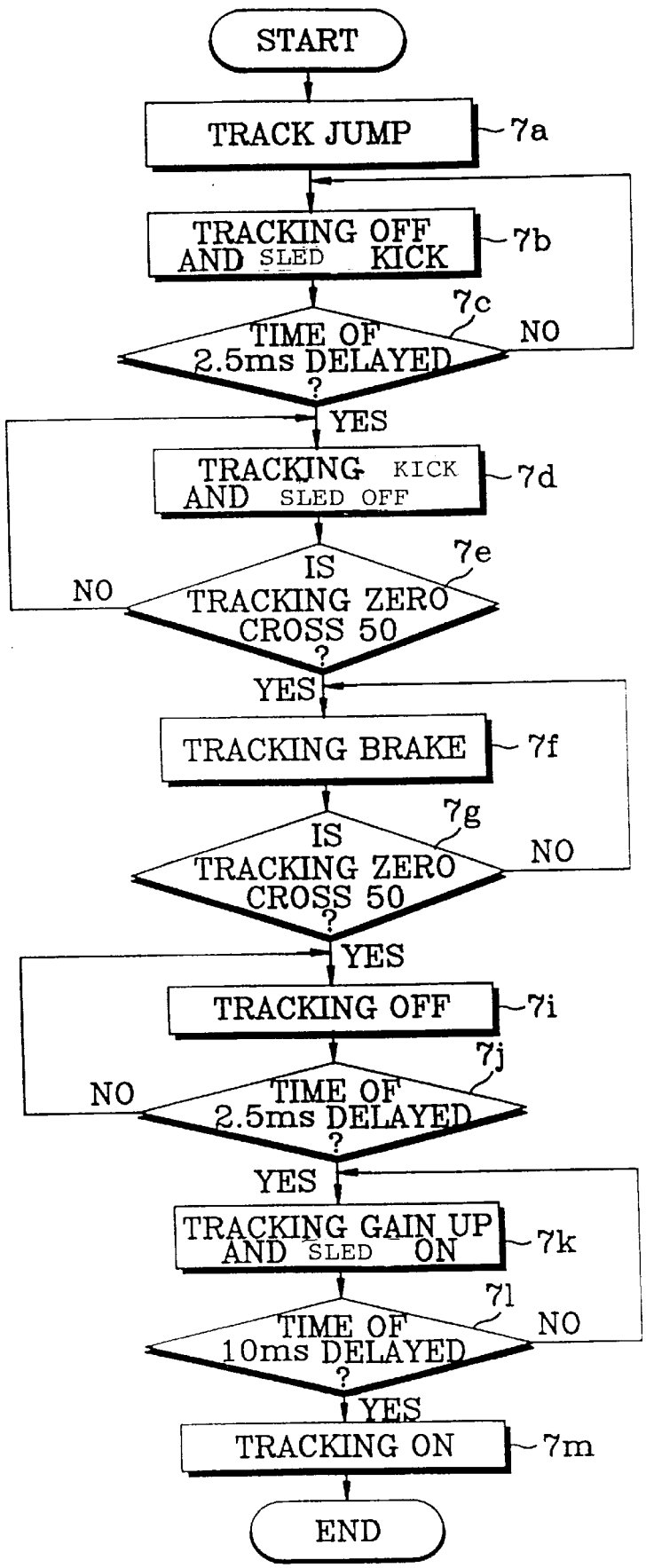
FIG. 7 is a flow chart for explaining the present invention.

First, a brief description of a track jump according to the preferred embodiment of the inventive method is described with reference to FIG. 7. A more detailed explanation follows, making further reference to FIGS. 8 and 9.

In performing a track jump, the tracking of an object lens is first turned off and the sled is kicked to move the pickup in a track jump mode. After the predetermined time of the sled kick, tracking for moving the object lens is turned on. When the sled control for stopping the pickup is turned off after the predetermined times passes, it is first checked whether the number of a zero crossings signal reaches "n" (in this example n=50). When the zero crossing number "n" is reached, the tracking is braked and it is checked whether the track zero crossing reaches the number "n" (n=50). When the n number is reached, tracking for moving the object lens is turned off and the off state is maintained for a predetermined time period. Thus, the tracking gain of the driving of the object lens is obtained, and stabilization time is provided by turning on the sled to drive the pickup. After the stabilization time passes, a tracking on state is kept by turning on the sled.

That is, the gist of the present invention resides in a method for preventing bumping of the object lens with the wall surface of the sled during a jump to access a desired track. Specifically, according to the inventive method, in order to perform a jump, first tracking is turned off and the sled is turned on so as to perform a "rough" jump. Then, the sled is turned off and the tracking is turned on in order to perform fine jump to the appropriate track. The "zero crossing" of the tracking is counted during the state where the sled is turned off and the tracking is turned on.

Figure 8A:
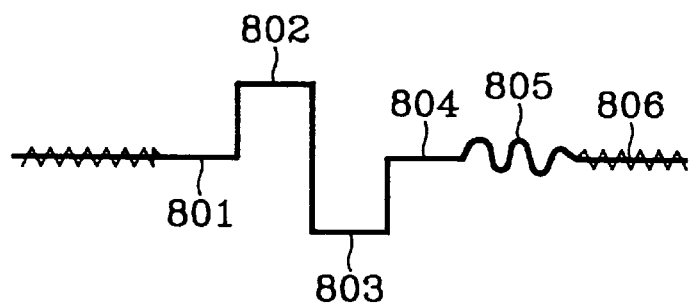
FIGS. 8A and 8B are timing diagrams indicating the control of the tracking and sled according to the present invention.
Figure 8B:
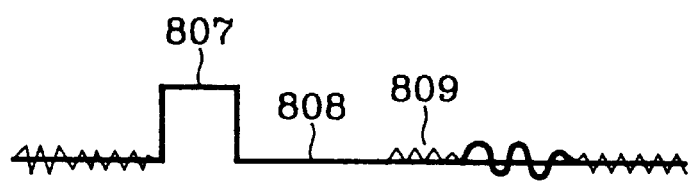

FIG. 8A is a tracking timing diagram and FIG. 8B is sled timing diagram.

Figure 9:
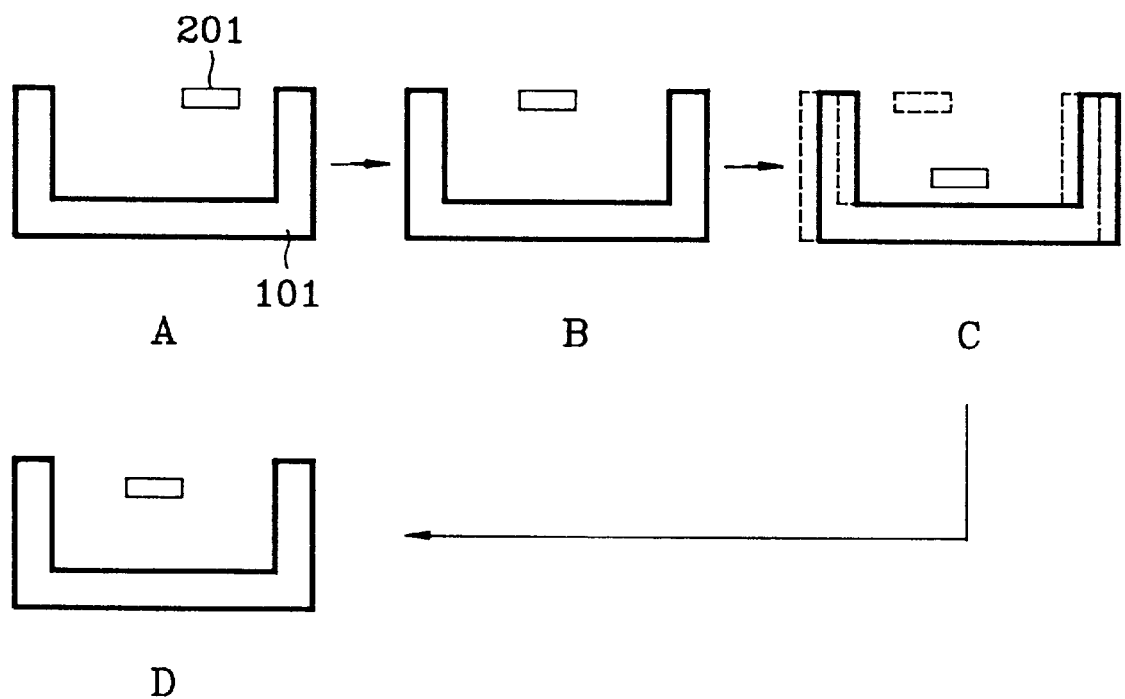
FIG. 9 shows the movement of a pickup portion and an actuator according to a the present invention.

Referring to FIG. 9, A shows the deviation between the pickup 101 and the object lens 201 before a jump; B shows that the object lens 201 is freely restored and sled-moved from the center of the pickup 101 due to the tracking jump in step 7b of FIG. 7; C shows that sled and tracking are concurrently moved due to the delay of about 4 ms, though the control voltage of the sled is first controlled; and D shows an example of free-restoration of the object lens at the center of the pickup by tracking off in step 7i.

The preferred embodiment of the present invention will now be described in detail, referring to FIGS. 3–7.

When microcomputer 300 performs a track jump, in step 7a, tracking is turned off in step 7b (801 of FIG. 8A). Upon receiving a control command to kick the sled (807 of FIG. 8B), the command logic circuit 302 analyzes the command to turn on the switched 318 and 317 via the switching control 313, and shifts the contact positions to points 1 to thereby transmit the tracking kick, brake and sled signals generated from the pulse generator 303. After a 2.5 ms of a first delay time in step 7c, the microcomputer 300 sends a control command signal to the command logic circuit 302 to cause the pulse generator 303 to generate the tracking kick signal (802 of FIG. 8A). A signal to turn off the sled (808 of FIG. 8B) is also generated and applied to the pickup 306 and the sled via the switches 317 and 320. It is then checked whether the zero crossing has reached 50 using the reading of the pickup 306 provided via the servo controller 304. Then, when it is reached, the microcomputer 300 generates a control signal to brake the tracking in step 7f (803 of FIG. 8A). When the number of the zero crossing generated from the servo controller 804 by the pickup and the sled according to the tracking brake reaches 50, tracking is turned off in step 7i (804 of FIG. 8A). After a second delay time of 2.5 ms in step 7j, the microcomputer 300 controls the tracking gain in step 7k (805 of FIG. 8A) and turns on the sled (809 of FIG. 8B). Then, after a third delay time of 10 ms in step 7l, tracking is turned on in step 7m (806 of FIG. 8A). That is, in the present invention, the sled and the tracking are moved with time delay of tracking so that tracking is turned off during the sled kick. Accordingly, jump margin is expanded so that the object lens can be moved to the center of the pickup and track off is available for a predetermined time period to expand the margin after tracking (actuator) jump.

As shown in A, B, C and D of FIG. 9, the object lens 201 being at a before-jump state A starts to free-restore and sled-move to the center of the pickup 101 due to tracking being off as in B. Then, though sled voltage is first controlled with the delay of about 4 ms between the sled and tracking as in C, since both are moved concurrently, it is restored freely at the sled center and tracking oscillation is prevented by the tracking off as in D. Accordingly, it is noted that the jump is achieved in a single process.

As described above, compared to the conventional technology where the sled and actuator lack jump margin due to the tracking movement deviation, the present invention is advantageous in that the jump margin can be always maintained within ±200 tracks since the actuator (pickup body) is always positioned at the center of the sled for each jump, as can be seen in FIG. 9.

It should be understood that the present invention is not limited to the particular embodiment disclosed herein as the best mode contemplated for carrying out the present invention, but rather that the present invention is appended claims.

What is claimed is:

1. A disk drive system comprising:

a sled movable by a servo motor;

an object lens disposed on the sled and movable by an actuator to perform tracking;

a microcomputer for controlling the operation of the servo motor and the actuator;

a switching unit receiving commands issued by the microcomputer and directing appropriate commands to the servo motor and the actuator;

wherein whenever said microcomputer initiates a track jump, the tracking of the actuator is turned off for a set predetermined period and the sled is kicked to perform the track jump.

2. The disk drive system of claim 1, wherein the microcomputer further counts a first number of track zero crossings during the track jump only by first issuing a command to turn off the sled and then alternately kicking said tracking and checking the first number of track zero crossings until the first number of track zero crossings reaches a first predetermined number.

3. The disk drive system of claim 2 wherein the microcomputer further counts a second number of track zero crossings by first issuing a tracking brake command and then alternately braking said tracking and checking the second number of track zero crossings until the second number of track zero crossings reaches a second predetermined number.

4. The disk drive system of claim 3 wherein the microcomputer further turns off the tracking actuator after the second number of track zero crossings reaches said second predetermined number and subsequently issues a tracking gain command and a sled on command after a second predetermined period.

5. The disk drive system of claim 4 wherein the microcomputer issues a tracking on command after a third predetermined period following issuance of the tracking gain command and the sled on command.

6. A method for stabilizing track jump by which bumping of an object lens disposed in a sled against the sled's wall can be prevented during track jump for accessing a desired track on a recording medium, wherein tracking is turned off for a set predetermined period whenever said sled is kicked to perform the track jump.

7. The method according to claim 6, further comprising the steps of:

issuing a tracking kick command following said predetermined period and alternately checking when a first number of track zero crossings has reached a first predetermined value;

issuing a tracking brake command when said first number of track zero crossings has reached said first predetermined value and alternately checking when a second number of track zero crossings reaches a second predetermined value;

issuing a tracking off command after said second number of track zero crossings reaches said second predetermined value; and following a predetermined time delay, issuing a tracking gain on command and a sled on command.

8. A method for stabilizing track jump of a recording medium by which bumping of an object lens disposed in a sled against a wall of the sled can be prevented during a track jump for accessing a desired track on a recording medium, wherein a number of track zero crossings are only counted by first turning off said sled and alternately kicking tracking and checking the zero crossing, until the number of track zero crossings reaches a predetermined number.

9. A microcomputer for operating a disk drive, said microprocessor preprogrammed to direct a track jump by executing the steps comprising:

(a) issuing a tracking off command and a sled kick command;

(b) following a predetermined time delay from step (a) issuing a tracking kick command and a sled off command;

(c) checking whether track zero crossing has reached a predetermined value;

(d) when the track zero crossing has reached the predetermined value, issuing a tracking brake command;

(e) checking whether track zero crossing has reached a second predetermined value;

(f) when the track zero crossing has reached the second predetermined value, issuing a tracking off command;

(g) following a predetermined time delay from step (f) issuing a tracking gain on command and a sled on command;

(h) following a predetermined time delay from step (g) issuing a tracking on command.

10. A computer readable medium having a program stored therein for assisting a disk drive microcomputer control the disk drive, said program comprising the steps:

(a) issuing a tracking off command and a sled kick command;

(b) following a predetermined time delay from step (a) issuing a tracking kick command and a sled off command;

(c) checking whether track zero crossing has reached a predetermined value;

(d) when the track zero crossing has reached the predetermined value, issuing a tracking brake command;

(e) checking whether track zero crossing has reached a second predetermined value;

(f) when the track zero crossing has reached the second predetermined value, issuing a tracking off command;

(g) following a predetermined time delay from step (f) issuing a tracking gain on command and a sled on command;

(h) following a predetermined time delay from step (g) issuing a tracking on command.

* * * * *